May 22, 1951 R. D. HULL ET AL 2,554,411
FISHING REEL
Filed Sept. 5, 1947 3 Sheets-Sheet 1

Fig. 1.

INVENTORS.
R. Dell Hull,
BY Willie R. Crawford,
Mason & Wyss
Attys.

May 22, 1951  R. D. HULL ET AL  2,554,411
FISHING REEL

Filed Sept. 5, 1947  3 Sheets-Sheet 3

INVENTORS.
R. Dell Hull,
BY Willie R. Crawford,
Mason and Wyss
Attys

Patented May 22, 1951

2,554,411

UNITED STATES PATENT OFFICE 2,554,411

FISHING REEL

R. Dell Hull and Willie R. Crawford, Tulsa, Okla., assignors to Castmaster Fishing Reel Corporation, Tulsa, Okla., a corporation of Delaware Application September 5, 1947, Serial No. 772,270

14 Claims. (Cl. 242—84.6)

1

The present invention relates to fishing reels and more particularly to improvements in reels of the type equipped with line overdrive means for preventing backlashes during casting operations. This application is a continuation-in-part of applicants' copending application Serial No. 634,682, filed December 13, 1945.

Various arrangements are suggested in the prior patent literature for eliminating back lash in a fishing reel by using a line overdrive roller powered from the line spool of the reel to exert a pulling force on the line as it leaves the reel during each casting operation and thus prevent slack line from accumulating adjacent the spool when the tension in the line slackens toward the end of the casting operation. In all of these arrangements, a spring biased idler roller is used to press the line into contact with the overdrive roller at least when the tension is slackened in the line during a casting operation. In spite of the great operational advantages of reels of this character, they have not been manufactured commercially for public use. This may be attributed, at least in part, to three difficulties. First, powering the overdrive roller and the idler roller from the spool during the casting operation tends materially to increase the inertia of the moving parts of the reel as well as the frictional drag in the moving mechanism, with an accompanying tendency to reduce the casting range. Secondly, the action of the idler roller in rotating and banging against the periphery of the overdrive roller during a casting operation tends to make a reel of the character described quite noisy. Finally, no satisfactory structural arrangement has been devised prior to the advent of the present improved structure for permitting the component parts of such a reel to be assembled at low cost on a production line basis.

It is an object of the present invention, therefore, to provide an improved fishing reel of the character described in which the above-mentioned difficulties are obviated.

More specifically, it is an object of the present invention to provide an improved fishing reel of the character described which is satisfactorily quiet in operation, may be easily and cheaply assembled using production line methods, and has the inertia and friction drag of its moving system reduced to a minimum.

It is another object of the invention to provide in a reel of the character described an improved brake mechanism for braking the overdrive roller and spool at any point in a casting operation.

2

According to a further and more specific object of the invention, improved low-cost facilities are provided for pressing the line against the periphery of the overdrive roller, which include no rotating parts or parts contacting the periphery of the roller, whereby quiet operation of the reel is assured.

It is still another object of the invention to provide an improved overdrive roller for use in a reel of the character described, which is of low-cost, rugged construction, is very light in weight, and is provided with a durable friction surface covering its periphery.

The invention, both as to its organization and method of operation, together with further objects and advantages thereof, will best be understood by reference to the following specification taken in connection with the accompanying drawings, in which:

Figure 1:
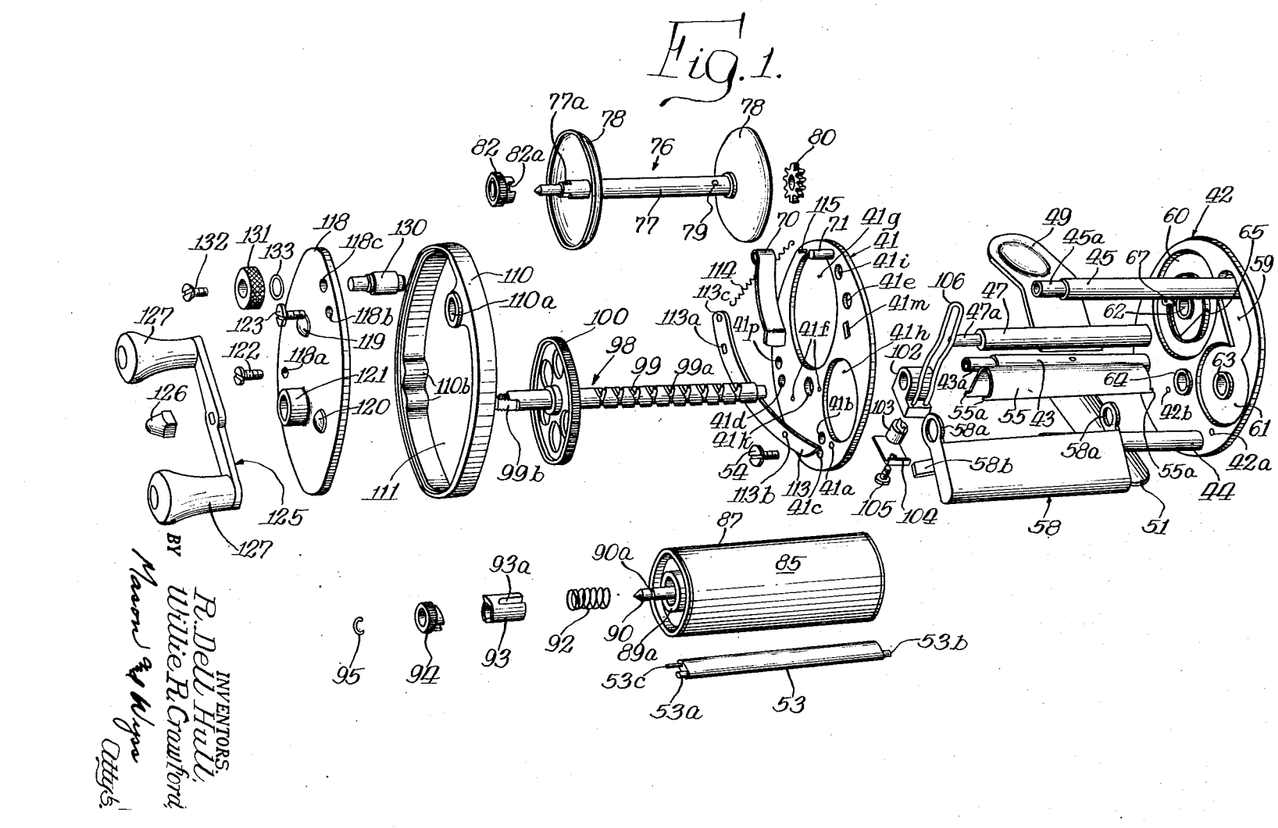
Fig. 1 is an exploded perspective view illustrating a preferred embodiment of the present improved reel.
Figure 2:
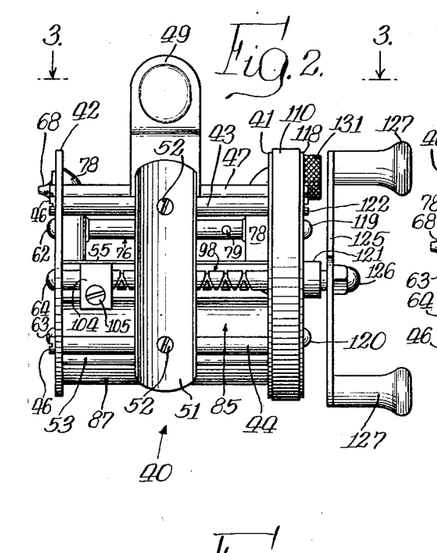
Fig. 2 is an underside elevational view of the reel shown in Fig. 1.
Figure 3:
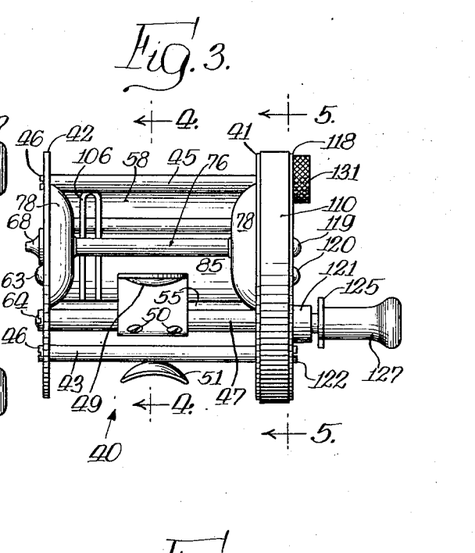
Fig. 3 is a perspective view looking in the direction of the arrows 3—3 in Fig. 2.
Figures 4, 5:
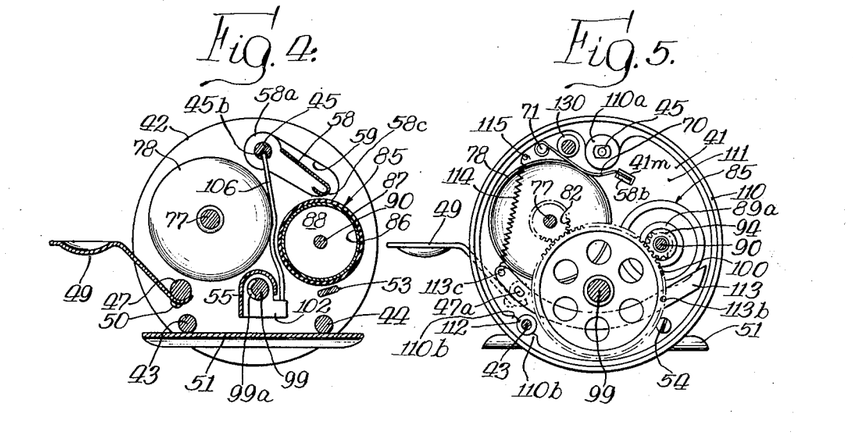
Fig. 4 is a sectional view taken along the lines 4—4 of Fig. 3.
Fig. 5 is a sectional view taken along the lines 5—5 of Fig. 3.

Referring now to the drawings, the present improved fishing reel generally designated by the reference numeral 40 is there illustrated as comprising a frame made up of a pair of end plates 41 and 42 adapted to be held in spaced parallel relationship by a plurality of parallel supporting and spacing rods 43, 44, and 45. At their respective right ends, these rods 43, 44, and 45 are provided with threaded openings for receiving screws 46 to hold the rods 43, 44, and 45 in assembled relationship with the plate 42. In addition to the rods 43, 44, and 45, the plates 41 and 42 also support a crank shaft 47 for limited pivotal movement relative thereto. This crank shaft forms a part of the brake control mechanism described more fully below and is provided with a portion 47a of reduced cross section which is preferably of rectangular or other non-circular configuration. The portion 47a of the crank shaft 47 is adapted to extend through an opening 41p defined in the end plate 41. Attached to the crank shaft 47 intermediate the ends thereof is a thumb or finger engaging lever 49 to which pressure may be applied to cause limited pivotal movement of the shaft 47 and thus produce the spool braking operation described below. As best illustrated in Fig. 4 of the drawings, the brake actuating lever 49 is fixedly attached to the crank shaft 47 by any suitable means such as welding or by the screws 50. To attach the reel 40 to a fishing rod, a conventional concave attaching plate 51 is provided which is preferably supported upon the rods 43 and 44 by suitable fastening screws 52.

Also pivotally supported between the end plates 41 and 42 is a brake shoe 53 having suitable end trunnions 43a and 53b which are respectively journaled in bearing openings 41a and 42a in the end plates 41 and 42. The brake shoe 53 is also provided at the end adjacent the plate 41 with an operating extension 53c adapted to extend through a slotted or enlarged opening 41b in the plate 41, thereby permitting limited pivotal movement about its trunnions 53a and 53b through movement of its operating extension 53c in the large or slotted opening 41b. The end of the rod 44 is provided with a threaded opening for receiving an assembly screw 54 adapted to extend through an opening 41c in the plate 41. The rods 43 and 45, on the other hand, are provided with portions of reduced cross section designated at 43a and 45a which are adapted respectively to extend through openings 41d and 41e in the end plate 41. Also extending between the plates 41 and 42 is a shield or shaft housing 55 which is preferably provided with a plurality of extensions 55a at end end thereof for respectively extending into openings 41f and 42b in the end plates 41 and 42 respectively.

In accordance with the present invention there is pivotally supported on the rod 45 an anti-backlash control shoe 58 having a pair of ears 58a at the ends thereof which are provided with suitable openings for receiving the rod 45. Along its underside, this shoe is provided with a highly polished wear surface 58c of curved cross sectional configuration for pressing the line into engagement with the overdrive roller in the manner explained below. The adjacent faces of the end plates 41 and 42 are provided with recesses, only one of which, i. e., that designated as 59 and formed in the plate 42, is shown in the drawings, for receiving the ends of the backlash control shoe 58. These recesses are of sufficient size to permit limited pivotal movement of the anti-backlash control shoe 58. Use of the anti-backlash control shoe 58 has certain very definite advantages over the idler roller arrangement disclosed in the parent application referred to above, all of which are pointed out more fully below.

As best illustrated in Fig. 1 of the drawings, the side of the end plate 42 facing the end plate 41 is also provided with circular recesses 60 and 61, the recess 61 being in effect an extension of the recess 59. Disposed centrally of the recesses 60 and 61 are a pair of bearing members 62 and 63, respectively. An identical bearing member 64 is also supported in the end plate 42. Any suitable low-friction type of bearing may be employed. Preferably, however, the bearings 62, 63, and 64 are of the type sold on the market as "Oilite" bearings.

For the purpose of equipping the reel 40 with the conventional click mechanism, there is supported in the recess 60 a resilient ring member 65 having a split end between which extends a click pawl 67. The click pawl 67 is fastened to a member extending through a slotted opening in the end plate 42 and a suitable manipulating button 68 fastened to said member is positioned on the other side of the plate 42 whereby the click pawl 67 may be moved closer or farther away from the center of the recess 60 to control the click mechanism in the usual manner. The ends of the resilient ring 65 adjacent the split portion thereof clampingly engage the click pawl 67 and hold it in either of its extreme positions depending upon the position to which it is moved by manual manipulation of the control button 68.

In accordance with another feature of the present invention, the plate 41 is provided with a relatively large spool opening 41g and a relatively large roller receiving opening 41h the centers of which are respectively aligned with the bearings 62 and 63. This plate is also provided with a plurality of smaller openings 41i, 51k, and 41m, the last of which is illustrated as a rectangular opening adapted to receive an ear 58b projecting from the anti-backlash control shoe 58. The size of the opening 41m may define the limits of the pivotal movement of the anti-backlash control shoe 58 by limiting the up and down movement of the ear 58b. This control shoe 58 is biased by gravity in a clockwise direction as viewed in Fig. 5 of the drawings. For the purpose of supplementing the gravity biasing force and of providing a controllable biasing force, a leaf spring 70 is provided which is supported at one end by a pin 71 extending from the face of the plate 41 remote from the end plate 42. The opposite end of the leaf spring 70 is adapted to engage the extension 58b of the anti-backlash control shoe 58 in the manner best shown in Fig. 5 of the drawings.

Figure 6:
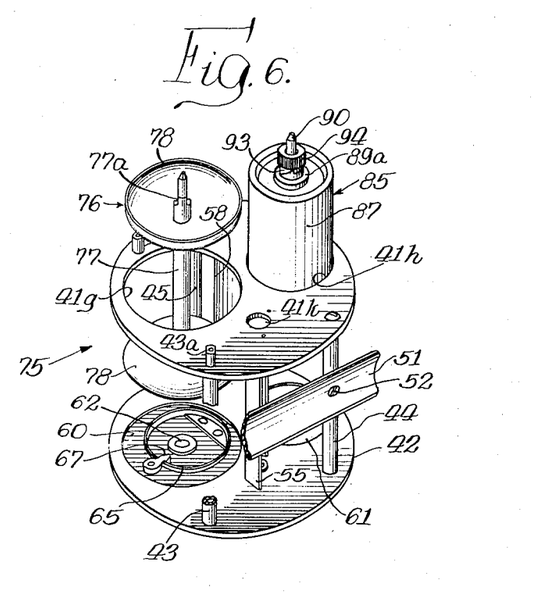
Fig. 6 is a perspective view of the reel frame subassembly showing a feature of the present invention pertaining to ease of assembly thereof.

The parts thus far described are adapted to be assembled to form a sub-assembly 75 best shown in Fig. 6 of the drawings, with the end plates 41 and 42 held in fixed parallel relationship with respect to each other by the supporting rods 43, 44, and 45, and the other members supported by the end plates 41 and 42. Thus, the anti-backlash control shoe 58 is assembled for pivotal movement on the rod 45, the brake shoe 53 is pivotally supported between the end plates 41 and 42 on its trunnions 53a and 53b, and the brake crank shaft 47 together with the thumb control lever 49 is pivotally supported between the end plates. It will be noted that in the subassembly 75, the ends of reduced cross section 43a and 45a of the rods 43 and 45 extend through the end plate 41 for a purpose which will become apparent as the following description proceeds. The advantage of employing an arrangement such as the subassembly 75 with the large openings 41g and 41h in the plate 41 will also become apparent from the following description.

For the purpose of supporting the fishing line employed with the reel 40, a spool assembly generally designated at 76 in Fig. 1 of the drawings is provided which comprises a shaft 77 to which are attached by any suitable means end bells 78 so as to define therebetween the spool portion upon which the fishing line may be wound. Intermediate the end bells 78, the shaft 77 is provided with an opening 79 into which the end of the fishing line may be inserted and tied to the shaft 77. A ratchet wheel 80 is rigidly fastened to one end of the shaft 77 and is adapted to cooperate with the click pawl 67 to complete the click mechanism partially described above. It will be noted that the concave portion of the right end bell 78, Fig. 1, defines a suitable chamber for housing the click mechanism. The end of the shaft 77 adjacent the ratchet wheel 80 is adapted to be journaled in the bearing 62, and this operation can readily be performed in the manner shown in Fig. 6 of the drawings by moving the spool assembly 76 into position through the large opening 41g in the end plate 41. In this regard it is pointed out that the end bells 78 are slightly smaller in diameter than the opening 41g. The click pawl 67 of the click mechanism is adapted to be engaged or disengaged from the ratchet 80 in the manner described above when the spool assembly 76 is assembled with the subassembly 75.

For the purpose of driving the spool assembly 76, a spool pinion 82 is provided which is adapted to be drivingly mounted upon the shaft 77 in any suitable manner. As shown, the shaft 77 is provided with a flatted portion 77a adapted to interlock with a cooperating slotted portion 82a of the spool pinion hub. Preferably the end of the shaft 77 adjacent the spool pinion 82 extends beyond the end of the spool pinion 82 for bearing support in the manner described below.

Figure 7:
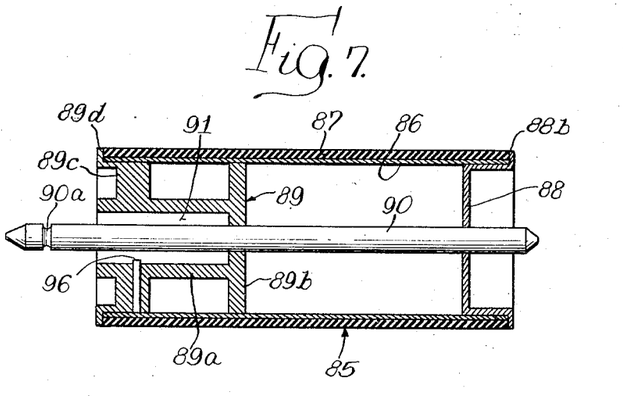
Fig. 7 is an enlarged sectional view of the improved overdrive roller embodied in the reel.

Also in accordance with the present invention, an improved anti-backlash roller assembly 85 is provided which comprises a thin-walled hollow tubular member 86 preferably formed of a very light material such as aluminum, magnesium or the like. To provide a suitable friction surface covering the exterior peripheral surface of the tubular member 86, such that the roller assembly 85 may satisfactorily perform its anti-backlash function, this tubular member is enclosed by an outer tube 87 formed of a suitable friction material such as rubber, cork, or neoprene. This cylinder surrounds and closely grips the tubular member 86, and is cemented thereto. One end of the tubular member 86 is closed by means of an end member 88 provided with a suitable shaft receiving opening in the center thereof and with a flange 88b abutting the ends of the tubular member 86 and tube 87. The outer edge of this flange is machined smooth and is exactly flush with the outer surface of the tube 87. The other end of the tubular member 86 is closed by a second end member 89 comprising an end piece 89b tightly engaging the internal wall of the tubular member 86 intermediate the ends thereof, and a shaft receiving opening through the center thereof for receiving a supporting shaft 90 extending along the axis of the tubular member 86. This shaft extends through the center openings in the members 88 and 89 and serves to support the tubular members 86 and 87. The end member 89 further comprises a part 89c having a flange 89d which abuts the ends of the tubular member 86 and tube 87. Like the flange 88b, the flange 89d is machined smooth and is exactly flush with the outer surface of the tube 87. Any suitable means for uniting the end members 88 and 89, the shaft 90 and the tubular member 86 so as to form a unitary assembly may be employed, such for example as press fits, welding, or the like.

For the purpose of receiving certain parts of the one-way clutch assembly described below, the end member 89 is also provided with a central hollow cylindrical part 89a which surrounds one end of the shaft 90 to define an annular chamber 91. This chamber is adapted to receive a coiled ratchet biasing spring 92 and a ratchet sleeve 93. These elements are inserted in the chamber 91 in the order named. The sleeve 93 is provided with end ratchet teeth engageable with end ratchet teeth of a driving pinion 94 to provide a one-way driving connection between the pinion and the shaft 90. The parts 92, 93, and 94 are held in position on the shaft 90 by means of a roller pinion retaining C-ring 95 adapted to be snapped into an annular recess 90a formed adjacent the end of the shaft 90. In order drivingly to connect the pinion 94 with the shaft 90 for unidirectional rotation thereof, the ratchet sleeve 93 is provided with a longitudinally extending slot 93a engageable with a pin 96 extending into the chamber 91 through the wall of the tubular member 86 and the part 89c of the end member 89. The spring 92 is compressed between the closed end of the chamber 91 and the ratchet sleeve 93 by means of the roller pinion retaining ring 95 and consequently biases the ratchet sleeve 93 into engagement with the clutch portion of the roller pinion 94. From the above description it will be understood that the roller assembly 85 best shown in Figs. 1 and 7 of the drawings is a unitary subassembly which is adapted to be assembled with the frame subassembly 75 shown in Fig. 6 of the drawings in the same manner that the spool subassembly 76 is assembled therewith. Specifically, the outside diameter of the roller assembly 85 is such as to permit its insertion through the opening 41h in the end plate 41 so that the end of the shaft 90 extending through the end plate 88 may be journaled in the bearing 63.

It will be understood that level wind mechanisms are generally provided in fishing reels of the general type under consideration. In the present improved reel, this mechanism comprises a level wind shaft and gear unit generally designated at 98 consisting of a shaft 99 and a gear 100 fixedly mounted upon the shaft. This assembly is adapted to be inserted through the opening 41k in the end plate 41 so that the shaft 99 is disposed within the confines of the trough-shaped shield or shaft housing 55. The end of the shaft 99 remote from the gear 100 is provided with a bearing end adapted to be inserted in the bearing 64 provided in the end plate 42. The shaft 99 is provided with the conventional reverse threads generally designated at 99a for moving a rider or traverse member 102 back and forth along the shaft 99. In order to provide a driving connection between the traverse member 102 and the shaft 99, a pawl 103 is provided which is adapted to extend into the shaft receiving opening in the rider 102 so as to engage the reverse threads 99a. This pawl is held in association with the rider 102 by means of a pawl retainer plate 104 and a screw 105 threaded into the traverse member 102. The rider 102 also carries an elongated line guide eye 106 for guiding the fishing line on and off the spool 76 during the reeling and unreeling operation. To support the line guide eye 106 in its movement with the rider or traverse member 102, the end thereof remote from the rider 102 is adapted to move in an elongated recess 45b formed in the rod 45 in the manner best shown in Fig. 4 of the drawings. The level wind mechanism is assembled with the frame assembly 75 shown in Fig. 6 of the drawings after the spool assembly 76 and the roller assembly 85 are assembled with the frame assembly. To this end, the level wind shaft and gear assembly 98 are moved into position with the shaft 99 extending into the opening 41k in the end plate 41. Upon insertion of the end of the shaft through the opening 41k, the rider or traverse assembly comprising the members 102 and 106 is associated with the shaft 99, following which the end of the shaft 99 is inserted into the bearing 64. The pawl 102 and the retaining plate 104 are then fastened into position by means of the screw 105 after which the level wind mechanism is suitably fastened to the frame assembly 75 with the gear 100 meshing with the pinions 82 and 94 in the manner clearly shown in Fig. 5 of the drawings. Following the assembly operations just described, all portions of the reel disposed between the end plates 41 and 42 are assembled. It will be noted that in order to overdrive the roller assembly 85, the pinion 94 is of substantially smaller diameter than the pinion 82.

From the above description it will be apparent that a plurality of operating members such as the gear 100, the pinions 82 and 94, and the leaf spring 70 are disposed adjacent the face of the end plate 41 remote from the end plate 42. In order to house this operating mechanism, means comprising an annular spacing ring generally designated as 110 and a cover plate 118 are provided to define a mechanism chamber 111 best shown in Fig. 5 of the drawings. The ring 110 is preferably formed of suitable molded plastic material which may either be transparent or of a suitable decorative color. Along its internal circumstance, the ring 110 is provided with suitable means such as the ear 110a and the protrusions 110b for supporting the ring 110 upon the end plate 41. A suitable opening is provided in the ear 110a for receiving the extension 45a of the rod 45. Also, the protrusions 110b are adapted to be disposed on either side of the rod portion 43a, extending beyond the plate 41, thereby to position the ring 110 relative to the end plate 41. If desired, a suitable bushing 112 (see Fig. 5) may surround the end of the rod 43 between the protrusions 110b.

In order to operate the brake shoe 53 in response to manipulation of the thumb actuated lever 49, a crank 113 is provided which is disposed in the chamber 111. As illustrated, this crank has a rectangular opening 113a for receiving the rectangular end of the crank shaft 47, and is provided with an opening 113b for receiving the operating member 53c of the brake shoe 53. A spring 114 tensioned between an end opening 113c in the crank 113 and a pin 115 carried by the end plate 41 normally biases the crank 113 to a position where the brake shoe 53 is out of engagement with the roller assembly 85. Preferably the crank 113 is assembled on the end plate 41 before the level wind shaft and gear assembly 98 are assembled with the frame subassembly 75. It will be understood that manipulation of the thumb actuating lever 49 causes limited pivotal movement of the crank shaft 47 and consequently limited movement of the crank 113, with the result that the brake shoe 55 is moved into braking engagement with the friction surface 87 of the roller assembly 85 in a manner which will be readily apparent from the above explanation. For the purpose of supporting the ends of the shaft 77, 90, and 99 remote from the end plate 42, the cover plate 118 fixedly mounts suitable bearing members 119, 120, and 121, preferably of the "Oilite" type, for respectively receiving the ends of these shafts. The plate 118 is also provided with openings 118a and 118b for receiving assembly screws 122 and 123 which are threaded into suitable threaded openings provided in the ends of the rods 43 and 45.

A suitable crank assembly generally designated at 125 is adapted to be attached to the end of the level wind shaft 99 extending through the bearing 121. Preferably the shaft 99 is provided with flats 99b at its outer end which interlock with the crank of the crank assembly 125 to prevent relative movement therebetween. A nut 126 is threaded onto the end of the shaft 99 to hold the crank assembly 125 on this shaft. As illustrated, the crank assembly 125 is provided with a plastic finger engaging handle 127 at each end thereof which is of the same color as the ring 110 so as to give the reel a pleasing appearance.

In accordance with one very important feature of the present invention, the opening 41m in the end plate 41 is so positioned with reference to the extension 58b of the anti-backlash control shoe 58 that a predetermined space is always provided between the shoe 58 and the friction surface of the roller assembly 85 throughout the length of the shoe. An alternative method of accomplishing the same end is that of using the lower edges of the recesses 59 in the end plates 41 and 42 as stop surfaces engageable by the lower edges of the shoe end parts 58a to hold the wear edge 58c spaced a predetermined distance from the periphery of the roller 85. By spacing the shoe 58 from the peripheral surface 87 of the roller 85, the friction drag on the moving parts of the mechanism is materially reduced. Also in prior art arrangements utilizing an idler roller biased to engage an overdrive roller, considerable noise is generated as a result of the idler roller rotating and bouncing against the periphery of the overdrive roller during operation of the mechanism. By spacing the element 58 from the overdrive roller 85, however, a static non-rotatable shoe 58 may be used and this source of noise is completely eliminated. Moreover, the manufacturing cost of the shoe 58 is substantially less than that of a suitable idler roller assembly.

In general, the minimum spacing between the wear surface 58c of the shoe 58 and the friction surface 87 of the roller assembly 85, shown somewhat exaggerated in Fig. 4 of the drawings, should be slightly less than the thickness of the lightest line likely to be used with the reel 40, and preferably is of the order of .005 inch. This insures proper anti-backlash operation of the roller assembly 85 and the shoe 58 since as was brought out earlier, the roller 85 is driven at a speed slightly greater than that of the spool assembly 76. In other words, the peripheral speed of the roller 85 is greater than the lineal speed at which the line is unreeled from the spool 76 regardless of the spool diameter. Thus, the gear ratios are such that the roller assembly 85 effectively acts as an overdrive mechanism during each casting operation, thereby to insure that any line unreeled as a result of momentum of the spool will not become tangled around the spool, but will be pulled away by the operation of the roller assembly 85.

For the purpose of controlling the pressure applied by the anti-backlash mechanism to the line, a tension adjusting cam 130 is provided which is disposed within the mechanism chamber 111 and is pivotally supported in the openings 41i and 118c in the plates 41 and 118 respectively. This cam is adapted to engage the upper surface of the leaf spring 70, and mounts a suitable manipulating knob 131 externally of the cover plate 118. A suitable washer 133 is preferably disposed between the knob 131 and the cover plate 118. It will be apparent that rotation of the knob 131 will rotate the cam 130 and will apply varying amounts of pressure to the antibacklash shoe 58 through the leaf spring 70. This has the effect of varying the pressure with which the shoe squeezes the line against the roller 85.

From the foregoing explanation it will be understood that in using the reel, the end of the line carried by the spool 76 is threaded through the level wind guide eye 106 and between the roller 85 and the shoe 58 for attachment to a lure, i. e., a plug. During each casting operation, the plug pulls the line from the spool 76, causing the latter to rotate in a clockwise direction as viewed in Figs. 4 and 5 of the drawings. As the spool rotates in this direction, it drives the roller 85 in the same direction through the driving connection provided by the gears 82, 100, and 94 and the one-way clutch sleeve 93. As stated above, the gear ratios between the gears 82, 100, and 94 is such that the peripheral speed of the roller 85 is always greater than the linear speed at which the line is leaving the reel, regardless of the size of the spool as determined by the amount of line on the spool shaft 77. Moreover, the line as it leaves the spool is pressed against the periphery of the roller 85 by the shoe 58 at any time when the line is slack. Hence the roller acts as an overdrive element in that it acts to pull the line off of the spool when the line tends to become slack. This means that slack line cannot accumulate between the spool shaft 77 and the roller 85. Hence there is practically no chance for the line to be reversely wound on the shaft as the line movement slows down or stops at the end of a cast.

It will be understood that the present improved brake mechanism is used to stop or slow down the speed of line feed out at the end of a cast. This is accomplished without "thumbing the spool" by simply depressing the thumb lever 49 to actuate the brake shoe 53 into engagement with the periphery of the roller 85. Specifically, as the lever 49 is depressed, the crank shaft 47 and connected link 113 are pivoted in a counterclockwise position as viewed in Fig. 5 of the drawings against the bias of the spring 114. As the right end of the link 113 is moved upward it pivots the brake shoe 53 about its trunnions 53a and 53b in a clockwise direction to bring the left upper edge of the shoe, Fig. 4, into engagement with the periphery of the roller. This has the effect of slowing or braking rotation of the roller. Also, since the roller 85 is directly geared to the spool shaft 77 through the one-way clutch comprising the clutch sleeve 93 and the gears 94, 100, and 82, the spool 76 is braked or slowed down concurrently with braking of the roller 85 and at a rate which prevents the accumulation of slack line between the spool 76 and the roller 85. It will be understood that when the thumb lever 49 is released, the spring 114 acts to restore the named parts of the brake mechanism to their respective normal positions wherein the brake shoe 53 is disengaged from the periphery of the roller 85.

The purpose of including the one-way clutch comprising the elements 93 and 94 in the driving connection between the spool 76 and the roller 85 is to prevent slack line from accumulating between the spool and roller as the line is reeled in. Thus, during each reeling-in operation, when the spool 76 is rotated in a counterclockwise direction as viewed in Figs. 4 and 5 of the drawings, the clutch teeth of the element 94 ride over the teeth of the clutch sleeve 93 without positively driving the roller 85. As this occurs, the sleeve 93 is moved deeper into the chamber 91 against the bias of the spring 92. In this regard it is pointed out that a very light coil spring 92 is used to bias the clutch sleeve 93 toward the clutch teeth of the element 94, thereby to insure effective declutching of the roller 85 from the spool 76 as the line is reeled in. This leaves the roller 85 substantially free for rotation by the line pull at a speed which will not cause the accumulation of line between this roller and the spool.

As will be evident from the above explanation, one of the major problems involved in the manufacture of a commercially acceptable reel of the improved construction herein disclosed is that of reducing to an absolute minimum the amount of inertia in the moving parts of the system and the amount of friction drag tending to slow down or brake the moving mechanism to a stop during a casting operation. In the development of the present reel to a satisfactory commercial structure, the desired reduction in inertia of the moving parts of the system is accomplished by making all moving parts of as light materials as possible consistent with wear requirements. To this end, the end bells 78 of the spool structure 76 are formed of aluminum, and the described hollow construction employing the thin-walled magnesium tube 86 and the thin-walled friction tube 87 is used in the roller structure 85. To further lighten this structure, the remaining parts thereof, exclusive of the shaft 90, are preferably formed of aluminum. In order further to reduce the inertia of the moving system, the large gear 100 carried by the level wind shaft 98 is provided with a punched out web to reduce the amount of metal in this gear. Preferably, bronze gears are used throughout. Another important factor contributing to the reduction of drag on the moving mechanism of the reel is the fact that the level wind facilities are operated during each casting operating and further that a driving roller 85 is used in conjunction with the level wind facilities having a length greater than the travel range of the guide eye 106. By virtue of this combination of elements, the line may be pulled off of the spool through the level wind guide eye 106 and the space provided between the shoe 58 and the periphery of the roller 85 in a straight direction. In other words, the line is free to travel back and forth longitudinally of the roller 85 under the guiding influence of the level wind guide eye 106 without being pulled sharply around one of the side pieces of the last-named element to impose a substantial frictional drag upon movement of the line off of the spool 85. This is in contrast with certain prior art arrangements wherein the line is fed through the level wind guide eye to very narrow rollers with the attendant result that the line is pulled taut against the side of the level wind guide eye in a sharp bend to impose frictional resistance on movement of the line off of the spool as the guide eye approaches the limits of its movement adjacent the ends of the spool. In the present improved structure, this difficulty is completely obviated by permitting the line to travel back and forth longitudinally of the elongated roller 85 as the guide eye 106 travels back and forth longitudinally of the spool 76.

It might be supposed that provision of the stationary shoe 58 to press the line into engagement with the periphery of the roller 85 would tend to impose an inordinate amount of frictional drag upon the moving parts of the system by virtue of the line being forced to move beneath the stationary wear surface 58c of this shoe. However, extensive tests have proved conclusively that this assumption is incorrect, the reason being that the spacing provided between the lower pressing edge of the shoe 58 and the periphery of the roller 85 reduces to an absolute minimum the contact between the line and the lower edge of the shoe. Suitable adjustment of the knob 131 to actuate the cam 130 and to vary the biasing tension imposed by the spring 70 on the shoe 58 may be relied upon to control the amount of force with which the shoe 58 presses the line against the periphery of the roller 85. In this regard it will be understood that this pressure should be as small as possible consistant with maintenance of contact between the line and the friction surface of the roller 85. As a further means of reducing the inertia drag imposed upon the moving parts of the reel during each casting operation, a one-way clutch connection may, if desired, be interposed between the crank handle 125 and the level wind shaft 98, this connection being directionalized in such a manner that the crank 125 is not driven by the spool 76 during a casting operation and is only operative to drive the moving parts of the mechanism and particularly the spool 76 during a reeling-in operation. Clutches of various forms readily suitable for this purpose are available in the art and accordingly details of such a clutch mechanism have been omitted from the disclosure.

Another important structural feature of the present improved reel pertains to the fact that the friction surface of the roller 85 as provided by the rubber tube 87 extends completely between the facing sides of the two end plates 41 and 42. In part, this is accomplished by making the depression 61 in the end plate 42 of a depth sufficient to more than receive the entire thickness of the flange 88b provided in the end member 88 of the roller structure. At the other end of the roller structure, the flange 89d of the end member part 89c and a small end segment of the rubber sleeve 87 are projected within the opening 41h of the end plate 41. Thus, the entire periphery of the roller 85 extending between the sides of the end plates 41 and 42 is formed of a friction material so that regardless of the position of the line along the roller 85 a friction surface is provided tending to pull the line off of the spool. On this point, it is pointed out further that the clearances between the periphery of the spool 85 and the recess 61 and opening 41h within which the ends of the roller are received, are such that even when the lightest line is used on the spool, it cannot become wedged between the periphery of the spool and the edge of the recess 61 or the edge of the opening 41h.

While one embodiment of the invention has been disclosed, it will be understood that various modifications may be made therein which are within the true spirit and scope of the invention as defined in the appended claims.

We claim:

1. In a fishing reel, a rotatable line spool, means including a rotatable roller driven from said spool in response to a casting operation for exerting a pulling force on the line as it leaves said spool, thereby to maintain the line between said spool and roller taut during said casting operation, a braking element engageable with said roller to brake said roller and said spool, spring means normally biasing said braking element out of engagement with said roller, and manually operable means for selectively moving said braking element into engagement with said roller against the bias of said spring means.

2. In a fishing reel, a rotatable line spool, a rotatable roller driven from said spool in response to a casting operation and operative to exert a pulling force on the line as it leaves said spool, thereby to maintain the line between said spool and roller taut during said casting operation, means biased toward the periphery of said roller for pressing the line against the periphery of said roller at least when tension in the line is slackened during said casting operation, means other than the line for positively preventing said last-named means from contacting the periphery of said roller, a braking element engageable with said roller to brake said roller and said spool, spring means normally biasing said braking element out of engagement with said roller, and manually operable means for selectively moving said braking element into engagement with said roller against the bias of said spring means.

3. In a fishing reel, a rotatable line spool, a rotatable roller driven from said spool in response to a casting operation and operative to exert a pulling force on the line as it leaves said spool, thereby to maintain the line between said spool and roller taut during said casting operation, and a non-rotatable shoe biased toward the periphery of said roller for pressing the line against the periphery of said roller at least when tension in the line is slackened during said casting operation.

4. In a fishing reel, a rotatable line spool, a rotatable roller driven from said spool in response to a casting operation and operative to exert a pulling force on the line as it leaves said spool, thereby to maintain the line between said spool and roller taut during said casting operation, a non-rotatable shoe biased toward the periphery of said roller for pressing the line against the periphery of said roller at least when tension in the line is slackened during said casting operation, and means other than the line for positively preventing said shoe from contacting the periphery of said roller.

5. In a fishing reel, a rotatable line spool, a rotatable roller driven from said spool in response to a casting operation and operative to exert a pulling force on the line as it leaves said spool, thereby to maintain the line between said spool and roller taut during said casting operation, a non-rotatable shoe biased toward the periphery of said roller for pressing the line against the periphery of said roller at least when tension in the line is slackened during said casting operation, and brake means including a second shoe selectively operable to engage said roller, thereby to brake said roller and said spool.

6. In a fishing reel, a rotatable line spool, a rotatable roller driven from said spool in response to a casting operation and operative to exert a pulling force on the line as it leaves said spool, thereby to maintain the line between said spool and roller taut during said casting operation, a non-rotatable shoe biased toward the periphery of said roller for pressing the line against the periphery of said roller at least when tension in the line is slackened during said casting operation, means other than the line for positively preventing said shoe from contacting the periphery of said roller, and brake means including a second shoe selectively operable to engage said roller, thereby to brake said roller and said spool.

7. A fishing reel comprising a frame provided with end plates and including means cooperating with one of said end plates to define a mechanism housing chamber, a line spool supported for rotation between said end plates, means including a roller supported for rotation between said end plates and driven from said spool during a casting operation for exerting a pulling force on the line as it leaves said spool, thereby to maintain the line between said spool and said roller taut during said casting operation, a brake shoe pivotally supported by said frame between said end plates for movement into engagement with the periphery of said roller, a shaft rotatably supported by said frame and extending between said end plates, an actuating element mounted upon said shaft between said end plates, and means disposed within said chamber for translating rotary movement of said shaft into rotary motion of said shoe to actuate said shoe into engagement with the periphery of said roller.

8. A fishing reel comprising a frame provided with end plates and including means cooperating with one of said end plates to define a mechanism housing chamber, a line spool supported for rotation between said end plates, means including a roller supported for rotation between said end plates and driven from said spool during a casting operation for exerting a pulling force on the line as it leaves said spool, thereby to maintain the line between said spool and said roller taut during said casting operation, a brake shoe pivotally supported by said frame between said end plates for movement into engagement with the periphery of said roller, a shaft rotatably supported by said frame and extending between said end plates, an actuating element mounted upon said shaft between said end plates, an arm fixedly supported upon one end of said shaft within said chamber and engageable with a part of said shoe to move said shoe into engagement with the periphery of said roller in response to rotation of said shaft in one direction, and spring means reacting between said arm and said one end plate for normally biasing said shoe out of engagement with the periphery of said roller.

9. A fishing reel comprising a frame provided with end plates and including means cooperating with one of said end plates to define a mechanism housing chamber, a line spool extending between said end plates and including a shaft rotatably supported by said frame, a rotatable roller extending between said end plates and including a shaft rotatably supported by said frame, a level winding mechanism including a level wind shaft extending between said end plates and rotatably supported by said frame in a position between the axes of rotation of said roller and spool, a crank carried by said level wind shaft externally of said chamber adjacent said one end plate, gearing connecting said shafts to provide a driving connection therebetween and comprising a large gear mounted for rotation with said level wind shaft, a pinion meshing with said large gear and mounted for rotation with said line spool shaft and a second pinion rotatably supported by said roller shaft and meshing with said large gear, all of said gears being housed in said chamber, a one-way clutch mechanism partially housed by said roller and connecting said second pinion to drive said roller from said spool in the same direction as said spool in response to a casting operation, said roller being operative to exert a pulling force on the line as it leaves said spool, thereby to maintain the line between said spool and roller taut during said casting operation, the facing walls of said end plates being provided with recesses adjacent the periphery of said roller, an elongated shoe extending longitudinally of said roller and rotatably supported by said frame with its ends extending into said recesses, said shoe having a lower wear surface for pressing the line against the periphery of said roller at least when tension in the line is slackened during a casting operation, at least one part of said shoe coacting with one of said end plates to prevent any portion of said wear surface from contacting the periphery of said roller, and means within said chamber for biasing said shoe in a direction to move said wear surface toward said roller.

10. A fishing reel comprising a frame provided with end plates and including means cooperating with one of said end plates to define a mechanism housing chamber, a line spool extending between said end plates and including a shaft rotatably supported by said frame, a rotatable roller extending between said end plates and including a shaft rotatably supported by said frame, a level winding mechanism including a level wind shaft extending between said end plates and rotatably supported by said frame in a position between the axes of rotation of said roller and spool, a crank carried by said level wind shaft externally of said chamber adjacent said one end plate, gearing connecting said shafts to provide a driving connection therebetween and comprising a large gear mounted for rotation with said level wind shaft, a pinion meshing with said large gear and mounted for rotation with said line spool shaft and a second pinion rotatably supported by said roller shaft and meshing with said large gear, all of said gears being housed in said chamber, a one-way clutch mechanism partially housed by said roller and connecting said second pinion to drive said roller from said spool in the same direction as said spool in response to a casting operation, said roller being operative to exert a pulling force on the line as it leaves said spool, thereby to maintain the line between said spool and roller taut during said casting operation, the facing walls of said end plates being provided with elongated recesses extending toward the periphery of said roller, an elongated shoe extending longitudinally of said roller and rotatably supported by said frame with its ends extending into said recesses, said shoe having a lower wear surface for pressing the line against the periphery of said roller at least when tension in the line is slackened during a casting operation, the end portions of said shoe coacting with the edges of said recesses to prevent any portion of said wear surface from contacting the periphery of said roller, said shoe having an ear extending through an opening in said one end plate into said chamber, a leaf spring disposed within said chamber and fixedly mounted at one end upon said one end plate, the opposite end of said spring engaging said ear to bias said shoe toward the periphery of said roller, a cam shaft rotatably supported within said chamber and including a cam adjustably engaging said spring intermediate its ends to vary the force biasing said shoe toward said roller, and an adjusting knob mounted upon said cam shaft externally of said chamber and rotatable to adjust said cam.

11. In a fishing reel which comprises a frame provided with end plates and a line spool supported for rotation between said end plates, an anti-backlash mechanism comprising an elongated roller driven from said spool during a casting operation and provided with a peripheral friction surface extending entirely between the facing walls of said end plates, an elongated element extending entirely between said end plates for pressing the line against the periphery of said roller at least when tension in the line is slackened during a casting operation, means for adjustably biasing said element toward the periphery of said roller, and means for preventing said element from contacting the periphery of said roller.

12. A drive roller assembly for use in an anti-backlash mechanism of a fishing reel, comprising an elongated thin-walled tubular member, a thin-walled tube of friction material supported by said tubular member externally thereof, a pair of end members fixedly fastened within the respective ends of said tubular member to support the same, one of said end members comprising an end piece fixedly engaging the internal wall of said tubular member intermediate the ends of said tubular member and a hollow cylindrical part extending from said end piece to one end of said tubular member, a supporting shaft extending through said hollow cylindrical part of said one end member, said end piece and the other end member for supporting the other named parts of the assembly, a drive pinion rotatably supported by said shaft adjacent said one end of said tubular member, and one-way clutch means for connecting said pinion in driving relationship with said tubular member, said clutch means being at last partially disposed within the space between said shaft and said hollow cylindrical part of said one end member.

13. In a fishing reel, a rotatable line spool, a rotatable roller driven from said spool in response to a casting operation and operative to exert a pulling force on the line as it leaves the spool, thereby to maintain the line between said spool and roller taut during said casting operation, and a non-rotatable shoe provided with a wear surface for engaging the line to press the line against the periphery of said roller at least when tension in the line is slackened during said casting operation.

14. In a fishing reel, a rotatable line spool, a rotatable roller driven from said spool in response to a casting operation and operative to exert a pulling force on the line as it leaves the spool, thereby to maintain the line between said spool and roller taut during said casting operation, a non-rotatable shoe provided with a wear surface for engaging the line to press the line against the periphery of said roller at least when tension in the line is slackened during said casting operation, and means other than the line for preventing any part of said shoe from contacting the periphery of said roller.

R. DELL HULL.
WILLIE R. CRAWFORD.

REFERENCES CITED

The following references are of record in the file of this patent:

UNITED STATES PATENTS

| Number | Name | Date |
| --- | --- | --- |
| 422,938 | Hartshorn | Mar. 11, 1890 |
| 832,069 | Lindguist | Oct. 2, 1906 |
| 960,010 | Goldman | May 31, 1910 |
| 1,570,534 | Sweeney et al. | Jan. 19, 1926 |
| 1,908,108 | Boldman et al. | May 9, 1933 |
| 1,960,491 | Johnson | May 29, 1934 |
| 2,055,451 | Case | Sept. 22, 1936 |
| 2,169,625 | Weiss et al. | Aug. 15, 1939 |
| 2,181,259 | Balz et al. | Nov. 28, 1939 |
| 2,380,670 | Nelson | July 31, 1945 |